Figure 1:
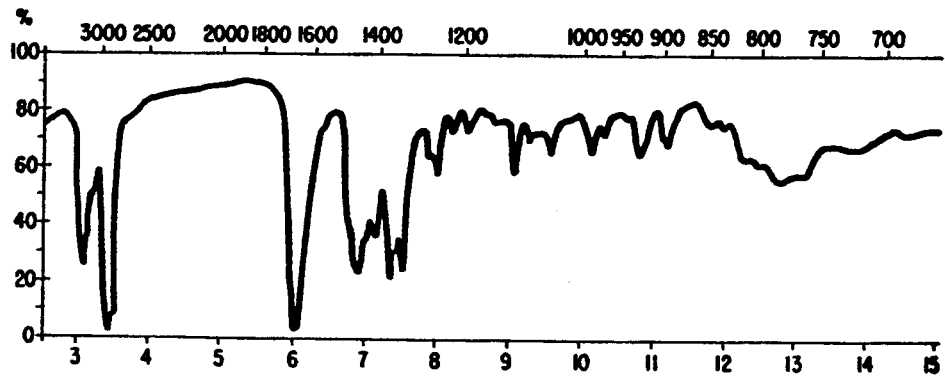

3,107,239
NEW PROCESS FOR THE PREPARATION OF α-AMINO-ε-CAPROLACTAM AND NOVEL INTERMEDIATES FORMED THEREBY
Carl Max Brenner, Riehen, near Basel, and Marcus A. Stevens, Basel, Switzerland, assignors to J. R. Geigy A.-G., Basel, Switzerland
Filed Dec. 28, 1960, Ser. No. 78,884
Claims priority, application Switzerland Dec. 30, 1959
8 Claims. (Cl. 260—239.3)

Natural lysine is one of the essential amino acids for man and the majority of domestic animals. This amino acid which is necessary to build up tissue protein must be provided by foodstuffs. Compared with the other essential amino acids present in wheat protein and to a less extent also in other cereal proteins, lysine is present in an amount which is less than that necessary for the building up of human and animal tissue. It is therefore of importance to find economic processes for the obtention of lysine in order to be able to add this important amino acid to wheat protein or to the foodstuffs produced from wheat, and to better adapt their amino acid content to that of the tissue protein without a noticeable increase in price.

The present invention relates to a novel process for the preparation of α-amino-ε-caprolactam and its salts from α,α-dichloro-ε-caprolactam and to new intermediates which are formed during this process. The α-amino-ε-caprolactam obtained by this process is a valuable and cheap starting material for the synthesis of lysine. The α,α-dichloro-ε-caprolactam can easily be produced in the known manner from ε-caprolactam, a marketed product, and phosphorus pentachloride (J. von Braun and A. Heymons, Berichte, 63, 502). The α-amino-ε-caprolactam can easily be converted by known methods into lysine. Thus, the aim of the present invention is to convert α,α-dichloro-ε-caprolactum in a new and simple manner into α-amino-ε-caprolactam by way of new intermediates. The process according to the invention for the production of α-amino-ε-caprolactam or its salts is characterised by reacting α,α-dichloro-ε-caprolactam at a raised temperature, advantageously in alcoholic solution or in the melt, with two to five times the molar amount of an alkali metal alcoholate, in particular with one prepared from alkanols, cycloalkanols, arylalkanols or alkenols. On completion of the reaction, the 2-substituted 6-aminohexene(2)-acid lactam so formed of the general Formula I

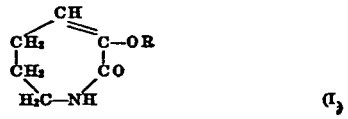

wherein R represents the organic radical of the alkali metal alcoholate reacted, in particular an alkyl, cycloalkyl, aralkyl or alkenyl radical, is reacted with about half the molar amount of a mineral acid salt of hydrazine, the reaction being performed at a pH of 0.8 and 3.0 and at a temperature of 60–120° C., and finallly, the hydrazine derivative so formed is completely hydrogenated catalytically.

The use of an alcohol, for example of an alkanol, as solvent in the first step of the process is of advantage as this causes the reactants to be brought in an homogeneous phase into inner contact with each other. It is advantageous if this reaction is performed while excluding water. As the reaction is exothermic, it is only necessary to apply heat at the beginning and towards the end of the reaction in order to start and then to complete it. Generally a rise in temperature up to the boiling point of the alcohol used is sufficient for this purpose, or, if the reaction is performed in the melt, up to the melting point of the α,α-dichloro-ε-caprolactam. The first step of the process according to the invention is performed with at least 2, preferably however, with 3 mols of alcoholate, e.g., sodium ethylate, per mol of α,α-dichloro-ε-caprolactam. The alcoholate corresponding to —O—R in the intermediate product of the general Formula I can be that of any alkali metal desired with an aliphatic, cycloaliphatic or araliphatic alcohol; however, the alcoholates of low molecular alkanols or alkenols are preferred as they lead to products which can more easily be distilled. If an alcohol is used as solvent, then advantageously the alcohol corresponding to the alkali metal alcoholate is used, e.g., sodium methylate in methanol as solvent.

In the reaction of 2-substituted 6-aminohexene(2)-acid lactam (I) with hydrazine salts, a new hydrazine derivative of formula $C_{12}H_{18}N_4O_2$ is obtained, which hydrazine derivative is converted by hydrogenation into the α-amino-ε-caprolactam. The reaction with a hydrazine salt of a mineral acid is performed advantageously by heating, in solution at a pH of about 1, 2-substituted 6-aminohexene(2)-acid lactam of Formula I with a sulphate, nitrate or chloride of the hydrazine. The pH of about 1 can be maintained during the reaction either by buffering or by manual or automatic titration of the solution. The most advantageous pH for the reaction varies according to the temperature at which it is performed, but unsatisfactory results are obtained with acidity much greater than pH 1 or less than pH 3. In order to attain the best yields, a temperature between 60 and 120° C. must be maintained, and the reaction is best performed in saturated aqueous solution or in mixtures of water and an aliphatic alcohol as solvent. The same result can be obtained by melting the two compounds together. Advantageously hydrazine salts containing two mineral acid equivalents are used but satisfactory results can also be obtained by using hydrazine salts containing one mineral acid equivalent or by using mixtures of both types of hydrazine salts.

The analysis as well as the chemical and physical properties of the new hydrazine derivative indicate it to have a biheterocyclic structure (minus 2 H) corresponding to the formula and having two double bonds

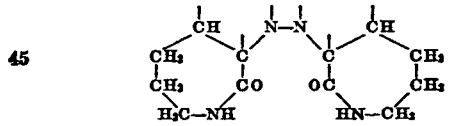

There is a graded hydrogen take-up of at least one mol in the catalytic hydrogenation of the hydrazine derivative.

Figure 2:
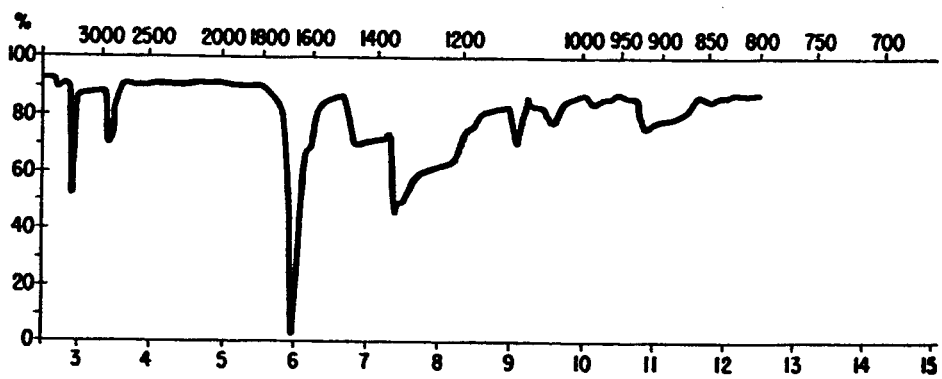

This new hydrazine derivative has a molecular formula $C_{12}H_{18}N_4O_2$ and a melting point of 233° C. In FIG. 1 of the accompanying drawings, the infra-red spectrum of the hydrazine derivative when it is suspended in the form of a "Nujol" mull is given. FIG. 2 shows the infra-red spectrum of an approximately 0.3% solution of the hydrazine derivative in $CH_2Cl_2$, thickness of layer 1 mm. In FIG. 1 and FIG. 2 the transmittance (vertical) is plotted against the wavelength in microns (horizontal). In FIG. 2, characteristic absorption bands are noted at 2.93 microns, 5.97 microns and 6.22 microns.

Figure 3:
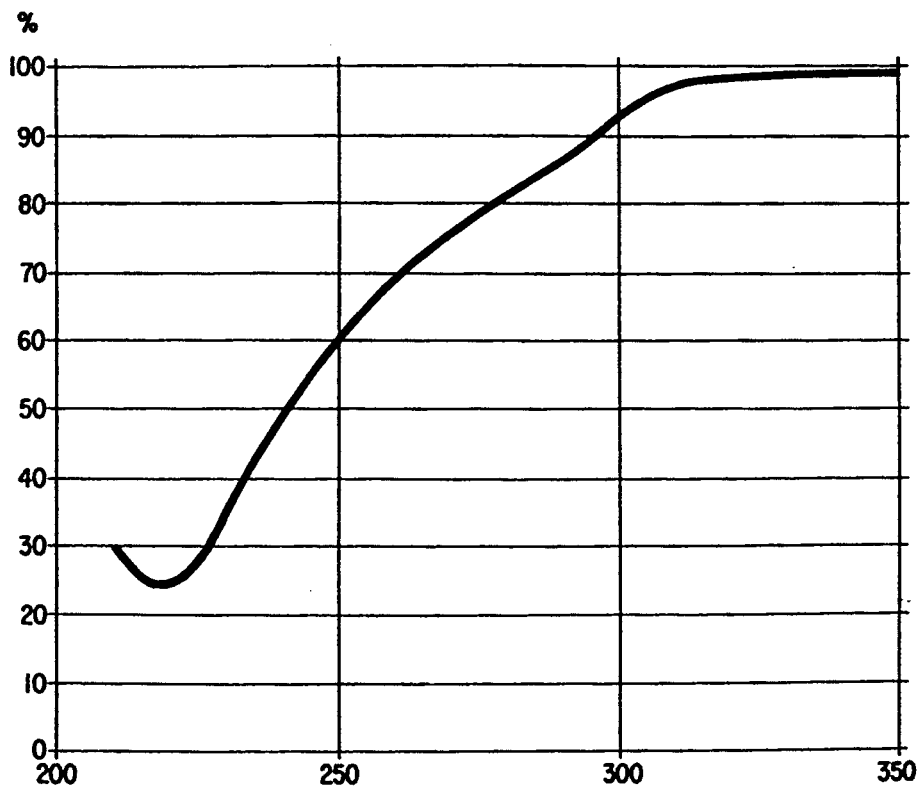

In FIG. 3 of the accompanying drawings the ultra-violet spectrum of a solution of .449 mg. of the hydrazine derivative in 50 ml. of methanol is given, thickness of layer 1 cm. The percent transmission (vertical) is plotted against the wave-length (horizontal). A maximum is noted at 219 millimicrons, log ε 4.24.

Under energetic hydrogenation conditions, three times the molar amount of hydrogen is necessary for the formation of α-amino-ε-caprolactam. The hydrogenation can be performed with hydrogen activated with nickel or palladium catalysts in a solvent such as water, dilute mineral acid (particularly with palladium charcoal as catalyst), weak bases (particularly with nickel as catalyst), fatty acids or alcohols.

A temperature range of 40–100° C. is advantageous for the formation of the 2-substituted 6-aminohexene(2)-acid lactam of Formula I. As for the metallic alcoholate utilised in the above process, any alkali metal alcoholate can be employed. However, on a practical basis, lithium, sodium and potassium alcoholates are preferred.

The following examples illustrate the production according to the present invention of the α-amino-ε-caprolactam by way of the new intermediate products. The temperatures are in degrees centigrade.

EXAMPLE 1

*(a) Production of 2-Methoxy-6-Aminohexene(2)-Acid Lactam*

18.2 g. (0.1 mol) of α,α-dichloro-ε-caprolactam, 16.2 g. (0.3 mol) of sodium methylate and 70 ml. of anhydrous methyl alcohol are boiled for 1 hour on a steam bath. After being initiated, the reaction is exothermic so that there is no need to apply heat for some time. Heat must finally be applied again towards the end to complete the reaction. After cooling, the reaction mixture is neutralised with 0.1 mol of glacial acetic acid, the sodium chloride is filtered off, the methanol is evaporated off and the residue is dissolved in 35 ml. of water. The aqueous solution is extracted twice with 20 ml. of chloroform each time and then three times with 10 ml. of chloroform each time. The combined chloroform solutions are dried, concentrated and the residue is fractionally distilled, whereupon the compound named above is obtained. It boils at 133–140° under 0.1 mm. pressure and melts at 96–98°; yield 11 g.=80% of the theoretical.

*(b) Production of Hydrazine Derivative*

1.41 g. (10 millimol) of this 2-methoxy-6-aminohexene(2)-acid lactam or 1.55 g. of 2-ethoxy-6-aminohexene(2)-acid lactam which can be produced in a similar manner, 0.525 g. (5 millimol) of $H_2N.NH_2.2HCl$, 0.69 g. (5 millimol) of $KH_2PO_4$ and 20 ml. of water are heated for 1 hour on a steam bath (pH about 1). After cooling to 0°, excess $H_2N.NH_2.2HCl$ is filtered off under suction and the aqueous solution is then made phenolphthalein alkaline (pH 8.3). This is then extracted three times with 20 ml. of chloroform each time, the combined extracts are dried over $Na_2SO_4$, the solvent is evaporated off and the residue is recrystallised from methanol/ether. The hydrazine compound obtained melts at 232–234°; yield 50%.

Analysis:

|  | C, Percent | H, Percent | N, Percent |
|---|---|---|---|
| Calculated | 57.56 | 7.25 | 22.40 |
| Found | 57.50 | 7.49 | 22.12 |

*(c) Production of DL-α-Amino-ε-Caprolactam*

250 mg. of the hydrazine derivative obtained by reacting 2-methoxy- or 2-ethoxy-6-aminohexene(2)-acid lactam and hydrazine (M.P. 233°, formula $C_{12}H_{18}N_4O_2$), are dissolved in 25 ml. of water. 2.0 ml. of 1 N-hydrochloric acid are added to this solution. The solution is shaken with hydrogen in the presence of 50 mg. of palladium charcoal (5%) at room temperature and normal pressure. Under these conditions, of the amount of hydrogen necessary for the hydrogenation of two double bonds and splitting of the hydrazo group, 80% is taken up within 12 hours and 100% is taken up within 20½ hours. After the take-up of the theoretical amount of hydrogen, the catalyst is removed from the solution, the solution is concentrated and the residue is suspended in 5 ml. of ethanol and filtered. The filter residue is DL-α-amino-ε-caprolactam hydrochloride. It is in the form of white crystals which melt at 296–297°; yield 0.24 g. (74%). The hydrogenation can be performed as follows:

260 mg. of the hydrazine derivative obtained by the reaction of 2-methoxy- or 2-ethoxy-6-aminohexene(2)-acid lactam and hydrazine are dissolved in 180 ml. of water. 0.1 ml. of 1 N-caustic soda lye are added to this solution and it is shaken with hydrogen in the presence of 5 g. of Raney nickel for 2 hours at 80° and 100 atm. The catalyst is then filtered off and the residue is washed with alcohol. The solution is evaporated to dryness, the residue is taken up in a little alcohol and glacial acetic acid is added. The crystals are filtered off under suction and washed with alcohol/ether (1:1). 165 mg. of α-amino-ε-caprolactam acetate which melts at 170–172° are obtained.

EXAMPLE 2

*(a) Production of 2-Ethoxy-6-Aminohexene(2)-Acid Lactam*

9.1 g. of α,α-dichloro-ε-caprolactam are added to a solution of 3.45 g. of sodium in 50 ml. of ethyl alcohol and the resulting solution is refluxed for 1 hour. The solution is then neutralised with 8.3 ml. of 6 N-hydrochloric acid, filtered and evaporated to dryness under reduced pressure. The residue is dissolved in a minimal amount of water, the aqueous solution is extracted with chloroform, the chloroform solution is concentrated and the oil which remains is distilled. According to analysis, the pale yellow oil which passes over at 112–113° under 0.04 mm. pressure, is 2-ethoxy-6-aminohexene(2)-acid lactam (calculated C: 61.70; H: 8.17; N: 9.23; found C: 61.91; H: 8.44; N: 9.03). On standing, colourless crystals in the form of needles slowly separate from the yellow oil. If the oil is rubbed with 2–5 parts by volume of ether in order to begin the crystallisation, then a good yield of 2.24 g. (29%) of the crystallised 2-ethoxy compound is obtained; M.P. 67–69°.

*(b) Production of the Hydrazine Derivative and Hydrogenation*

2.1 g. (20 millimol) of $H_2N.NH_2.2HCl$ are dissolved in 5 ml. of 70° warm water. The pH of the solution is adjusted to 1 with about 4.48 ml. of 4 N NaOH. Then 6.2 g. (40 millimol) of 2-ethoxy-6-aminohexene(2)-acid lactam or 5.64 g. of the 2-methoxy-6-aminohexene(2)-acid lactam obtained according to Example 1 (a) are added to the solution and the whole is reacted at 70° for about 75 minutes. During the reaction, the hydrochloric acid liberated is constantly neutralised or the acidity of the reaction mixture is kept constant at pH 1.

On completion of the reaction the hydrazine derivative, without previously isolating it but after the addition of 30 ml. of 2 N-hydrochloric acid and 500 mg. of palladium charcoal (5%), is hydrogenated for 24 hours at room temperature and normal pressure. The DL-α-amino-ε-caprolactam is worked up as described under (1) or (2) below:

(1) The aqueous solution is concentrated in vacuo, the residue is suspended in anhydrous ethanol, the pH of the suspension is adjusted to 9 with sodium ethylate, filtered and the filtrate is concentrated. Vacuum sublimation of the residue at 166–170° and 13 mm. Hg gives 2.95 g. of α-amino-ε-caprolactam which melts at 68–70°; yield 58%.

(2) Ammonium reineckate dissolved in dimethyl formamide/water (1:1) is added to the aqueous solution. The aminocaprolactam-reineckate is filtered off, dissolved in acetone/water (80:20) and excess aqueous silver sulphate solution is added. Excess silver sulphate and sulphuric acid are precipitated with the calculated amount of barium chloride, the barium sulphate is filtered off and the solution is concentrated. The crude α-aminocaprolactam hydrochloride which remains is taken up in alcohol, the solution is filtered and the filtrate is concentrated. 4.75 g. (72%) of hydrochloride which melts at 294° are obtained.

What we claim is:

1. Process for the production of α-amino-ε-caprolactam and its salts which comprises heating a mixture of α,α-dichloro-ε-caprolactam with 2 to 5 times the molar amount of a member selected from the group consisting of alkali metal methylate and alkali metal ethylate, to form a 2-substituted 6-aminohexene(2)-acid lactam of the formula

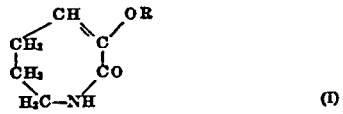

(I)

wherein R represents a member selected from the group consisting of methyl and ethyl, mixing said lactam with approximately a half molar amount of a mineral acid salt of hydrazine at a pH between 0.8 and 3.0 and at a temperature of 60–120° C. to form a biheterocyclic hydrazine derivative and then catalytically hydrogenating said hydrazine derivative.

2. Process according to claim 1 wherein the alcoholate is sodium methylate.

3. Process according to claim 2 wherein the alcoholate is employed in a methanol solution.

4. Process according to claim 1 wherein the alcoholate is sodium ethylate.

5. A compound of the formula

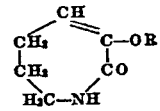

wherein R represents a member selected from the group consisting of methyl and ethyl.

6. The compound, 2-methoxy-6-aminohexene(2)-acid lactam of the formula

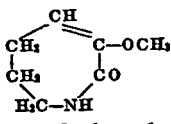

7. The compound, 2-ethoxy-6-aminohexene(2)-acid lactam of the formula

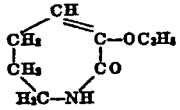

8. A bieterocyclic organic compound having the formula $C_{12}H_{18}N_4O_2$, having two double bonds, and also having a bridge head of two nitrogens between the two heterocyclic nuclei, said compound being characterized by the following properties: molecular formula $C_{12}H_{18}N_4O_2$; melting point 233° C.; solubility in methanol, methanol/ether, chloroform and methylene chloride; absorption bands in the infra-red region of the spectrum, when in mineral oil, as shown in the following figure

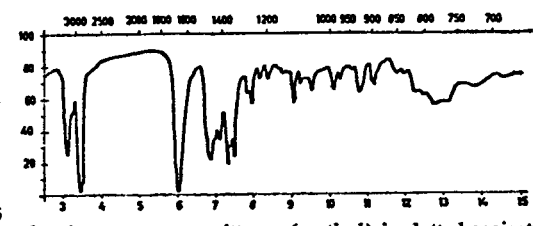

wherein percent transmittance (vertical) is plotted against wavelength in microns (horizontal); absorption bands in the infra-red region of the spectrum, when in a solution of methylene chloride, as shown in the following figure

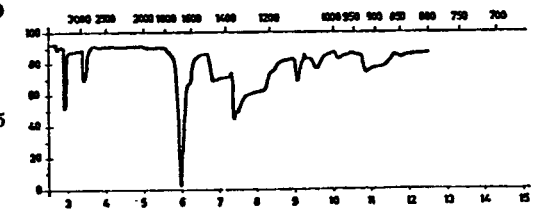

wherein percent transmitttance (vertical) is plotted against wavelength in microns (horizontal); a maximum in the ultra-violet spectrum at 219 millimicrons, log ε=4.24, when in the solution in methanol, as shown in the following figure

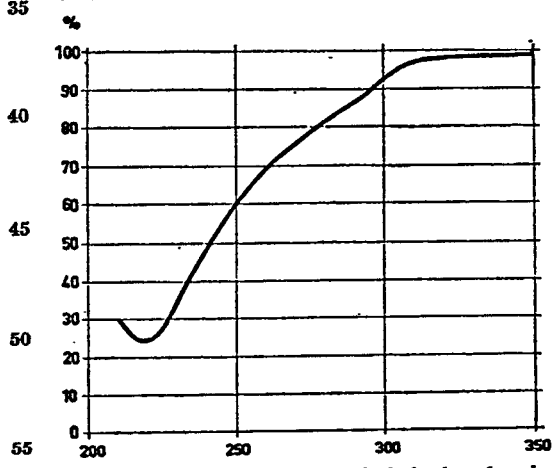

wherein percent transmittance (vertical) is plotted against wavelength in millimicrons.

No references cited.